Figure 1:
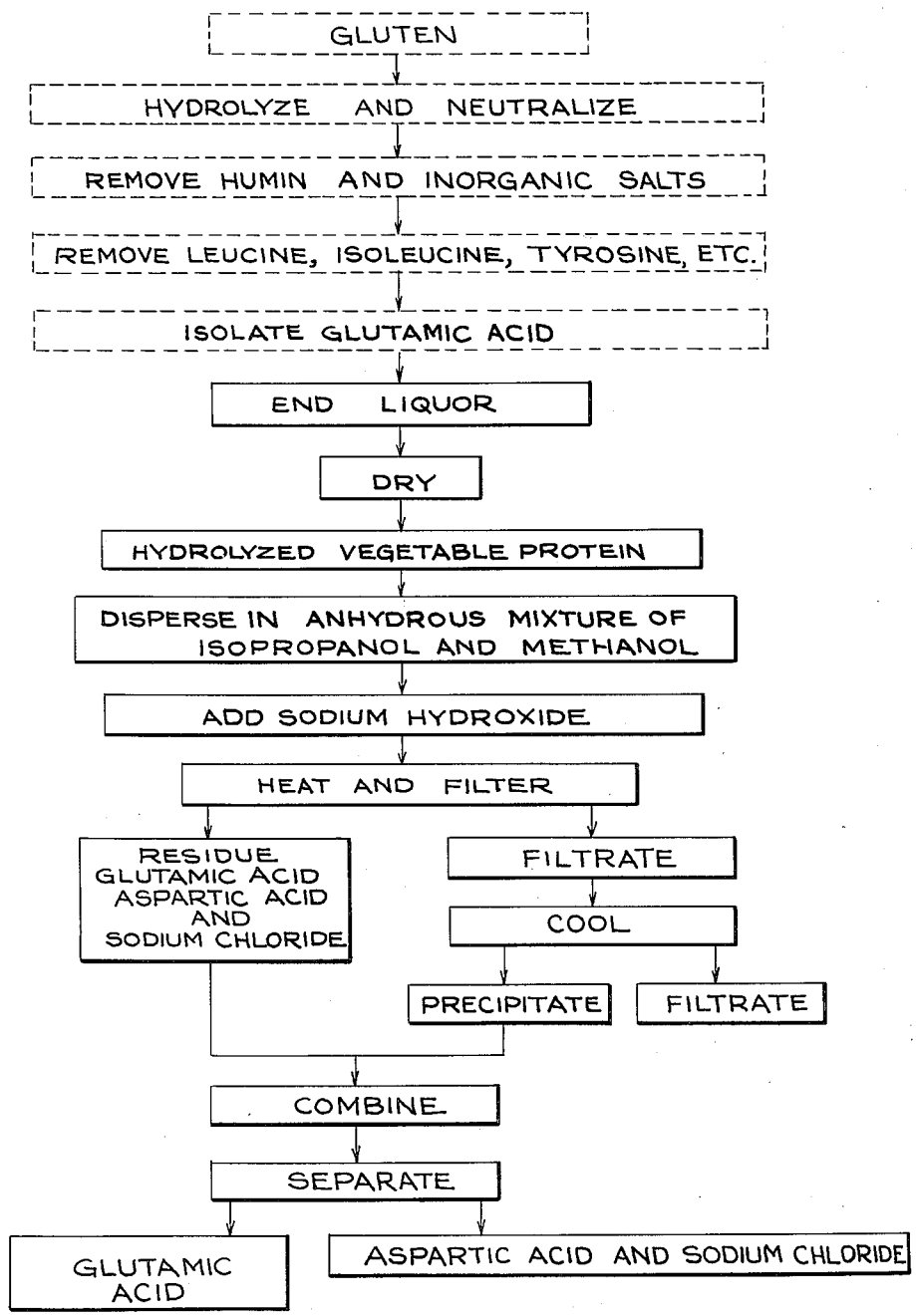

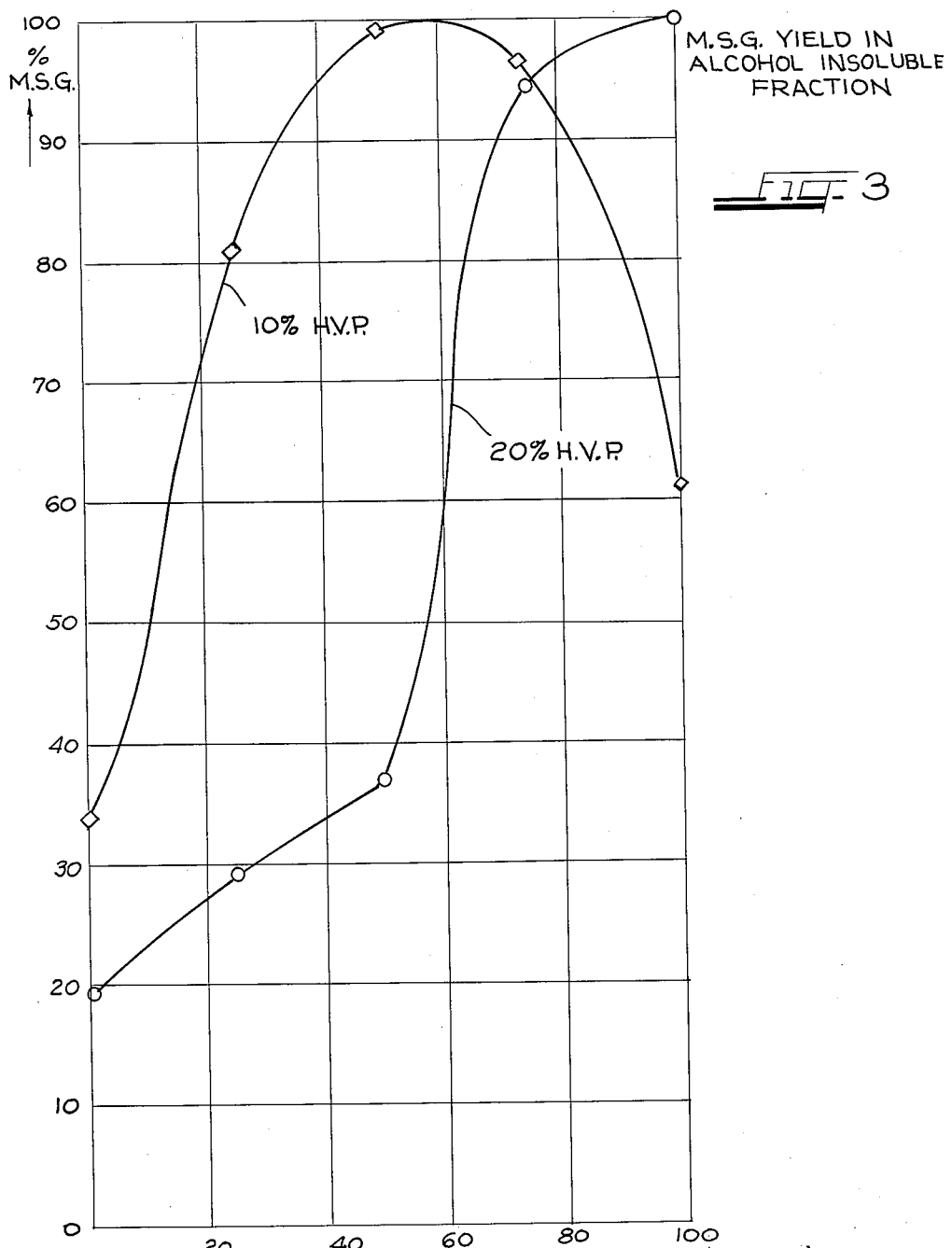

United States Patent Office 3,014,921
Patented Dec. 26, 1961

3,014,921
SEPARATION OF MONOAMINOMONOCARBOXYL-
IC ACIDS FROM DICARBOXYLIC AMINO ACIDS
Kenneth M. Gaver, Preville, Quebec, and Eduard G.
Adamek, Brockville, Ontario, Canada, assignors to
Ogilvie Flour Mills Company, Limited, Montreal, Quebec, Canada, a corporation of Canada
Filed July 13, 1959, Ser. No. 826,498
5 Claims. (Cl. 260—326.3)

The instant invention relates to methods for the separation of monoaminomonocarboxylic acids from dicarboxylic amino acids. More particularly, it relates to methods for separating the glutamic acid and aspartic acid from proline and monoaminomonocarboxylic acids present in hydrolyzed vegetable protein materials.

Commercially, glutamic acid is separated from hydrolyzed gluten, concentrated Steffen's filtrate, and other protein-containing materials in order to produce monosodium glutamate, which is a food condiment. The lliquor from which the glutamic acid is precipitated is known in the art as "glutamic acid end liquor" and will be referred to herein as "end liquor."

In one of the commercial processes for the manufacture of monosodium glutamate, wheat gluten is hydrolyzed and neutralized, precipitates containing humin and inorganic salts, etc. are removed, then leucine, isoleucine, tyrosine, etc. are removed. Thereafter, most of the glutamic acid is precipitated at a pH of about 3.2 leaving an aqueous end liquor which contains hydrolyzed vegetable protein material.

It is not unusual in a commercial operation to produce about 1800 gallons of glutamic acid end liquor daily. This amount of end liquor when neutralized usually contains more than 650 pounds monosodium glutamate, about 390 pounds monosodium aspartate, proline, and other useful compounds.

It is an object of the instant invention to provide methods for recovering useful products from glutamic acid end liquors.

It is a further object of the instant invention to provide methods for recovering dicarboxylic amino acids from hydrolyzed protein material containing monoaminomonocarboxylic acids.

A further object of the invention is the provision of processes for the separation of additional glutamic acid and aspartic acid from gluten hydrolysate end liquors containing hydrolyzed vegetable protein which remains after most of the glutamic acid has been removed from the hydrolysate.

A further object of the invention is the provision of improved processes for the isolation of proline from gluten and the like.

Further objects and features of the invention will be apparent from the following description and claims.

We have discovered that the solubility of dicarboxylic amino acids presents in dried hydrolyzed vegetable protein can be minimized while extracting the monoaminomonocarboxylic acids therefrom. When about 10% by weight of dried hydrolyzed vegetable protein is dispersed in a solvent consisting essentially of isopropanol and methanol in a ratio between about 1:1 and about 3:2, the monosodium salts of glutamic and aspartic acids are substantially insoluble while proline and the remaining amino acids dissolve in these alcohols. Because of this discovery, glutamic acid and proline can easily be recovered from spray dried glutamic acid end liquors by a process involving alcohol extraction.

Figure 2:
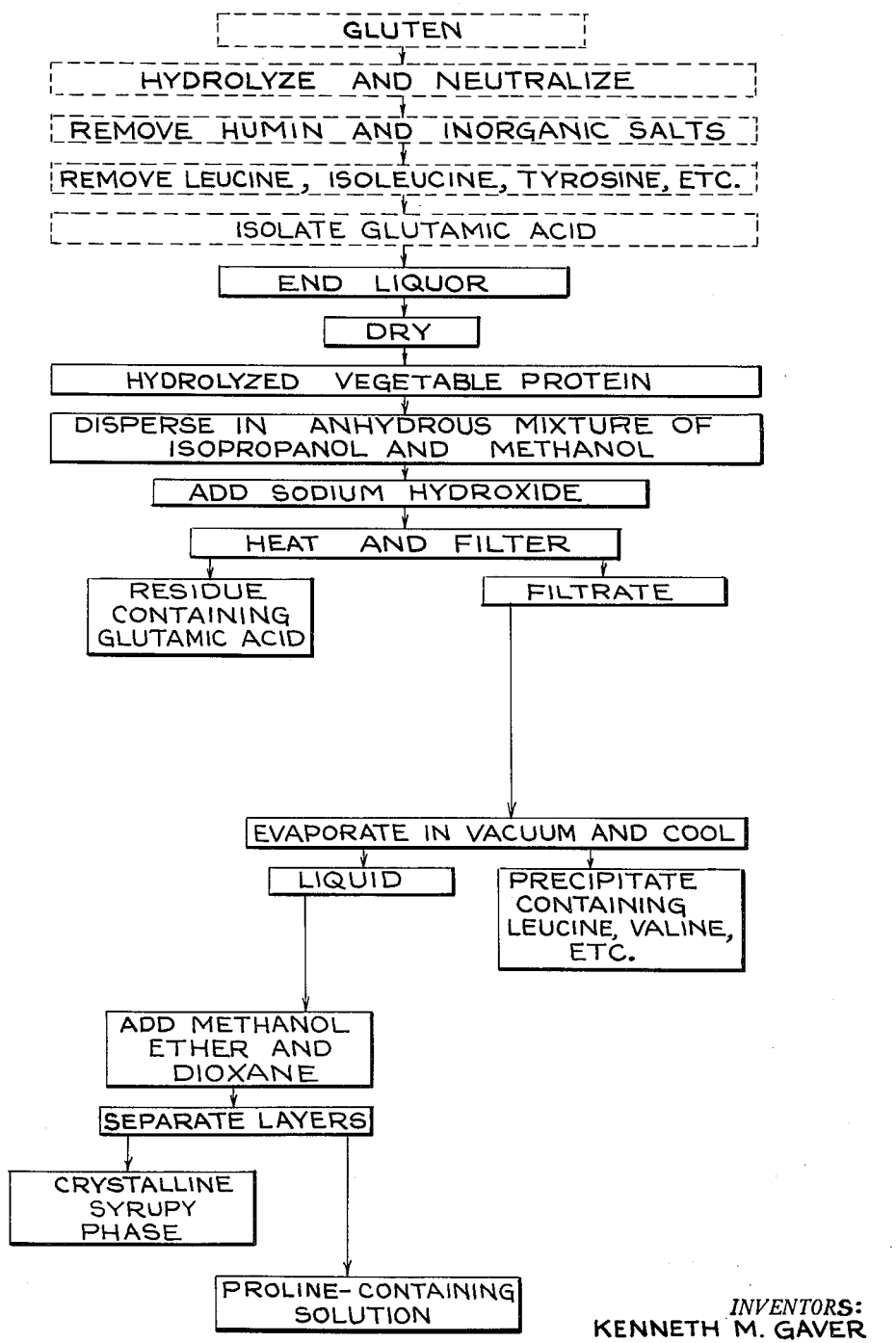

In the drawings:
FIG. 1 is a flow sheet illustrating an embodiment of the invention consisting of a process for obtaining maximum quantities of glutamic acid and aspartic acid from gluten;
FIG. 2 is a flow sheet illustrating an embodiment of the invention consisting of a process for obtaining proline from gluten; and
FIG. 3 shows the yield of monosodium glutamate in the insoluble fraction when 20% by weight and 10% by weight of hydrolyzed vegetable protein are mixed with solvent of varying methanol-isopropanol proportions.

In practicing one embodiment of the invention, glutamic acid, aspartic acid, and proline are recovered from glutamic acid end liquor. For example, gluten is hydrolyzed and neutralized, humin cake and then a tyrosine-leucine cake is precipitated and removed therefrom, and glutamic acid is precipitated at its isoelectric point and separated from an end liquor. This end liquor is dried for example by spray drying. This spray dried end liquor and other protein hydrolysate liquors which have been dried will be designated herein as "hydrolyzed vegetable protein" or "H.V.P." and is treated in accordance with the instant invention to separate dicarboxylic amino acids from the monoaminomonocarboxylic acids contained therein.

The hydrolyzed vegetable protein is dispersed in a solvent consisting of methanol and a higher alcohol from the group consisting of ethanol, propanol, and isopropanol. The preferred solvent contains isopropanol and methanol. The percentage of H.V.P. to solvent is important, although it may vary within a reasonable range. A proportion of 10% by weight of the dried hydrolyzed vegetable protein to about 90% by weight of the solvent is preferred. A solvent mixture of 50% to 60% by volume isopropanol and methanol is also preferred. Sufficient sodium hydroxide to obtain monosodium glutamate is added, and the adjusted mixture is then heated to the boiling point and solids separated by filtration. The filtrate is cooled and the precipitate separated. The two solid fractions are a mixture of glutamic acid, aspartic acid, and sodium chloride.

Glutamic acid can be separated from this mixture by any one of the conventional methods known in the art. For example, the mixture is dissolved in water to obtain a solution of about 1.3 specific gravity, and any undissolved sodium chloride is separated by filtration. The filtrate is adjusted to a pH between about 3 and about 3.2, and the glutamic acid which precipitates is separated, for example by filtration. Aspartic acid can be recovered from the filtrate.

Proline is also separated from spray dried end liquor in accordance with the instant invention. For example, between about 2.5% and about 20%, preferably about 10%, by weight of spray-dried H.V.P. is dispersed in a solvent mixture containing about 50% each of methanol and isopropanol. Sufficient sodium hydroxide is added to the dispersion to convert glutamic and aspartic acids to their monosdium salts, and the resulting mixture is heated to the boiling point. After cooling and if desired purification by carbon treatment, the precipitate containing monosodium glutamate is separated by filtration. The filtrate is evaporated at reduced pressure to about 1.2 specific gravity. If necessary, the concentrate is filtered. A mixture of ether and dioxane is added to the resulting solution, and the supernatant clear liquid is separated therefrom. The amounts of ether and dioxane to be used are governed by the system obtained after concentration to specific gravity 1.2, but are generally between about 2% and about 5% by weight of each. The clear liquid which is separated is evaporated to yield substantially pure proline.

In the instant process the preferred alcohol mixture consists of between about 50% and about 60% by volume isopropanol and methanol. It is known that the solubility of amino acids decreases with the homologous series of aliphatic alcohols toward the higher members. Amino acids general'y are less soluble in mixtures of methanol with between about 50% and 70% ethanol or a propanol than in methanol alone. Because water has too great dissolving power for all amino acids, the instant system is substantially anhydrous. The end liquor is spray dried and the alcohols are substantially anhydrous. The monoaminomonocarboxylic acids in the H.V.P. are preferentially dissolved by the preferred isopropanolmethanol mixture while the solubilities of glutamic acid and aspartic acid are selectively depressed when the preferred alcohol mixture contains about 10% by weight of H.V.P. The concentration of the H.V.P. in the alcohols is important, because mutual solubility plays an important role in two phase systems. The concentration of H.V.P. in the alcohols should be within the range of about 8 and about 12% by weight. An increase in the temperature of the system hastens equilibrium and increases solubility.

In the preferred embodiment of the invention the alcoholic slurry contains sufficient sodium hydroxide, sodium bicarbonate, or the like to convert glutamic acid to monosodium glutamate, which is less soluble than the acid. Alternately, the end liquor can be adjusted to a pH between about 7 and about 8 prior to spray drying.

The following examples are given to illustrate techniques used in practicing the instant invention; however, changes can be made therein without departing from the scope of the invention.

EXAMPLE I

A slurry of 10% by weight of H.V.P. in a 50:50 mixture of isopropanol and methanol (i.e. 50% isopropanol and 50% methanol by volume) was prepared. This was treated by the addition of a small amount (approximately 0.2% by weight) of solid sodium hydroxide to convert glutamic acid to the sodium salt. The slurry was heated to the boiling point and filtered hot. The residue contained glutamic acid, aspartic acid and sodium chloride. It contained no other amino acids.

EXAMPLE II

A slurry of 10% by weight of H.V.P. in a 50:50 mixture of isopropanol and methanol was prepared. The slurry was heated to the boiling point and filtered hot. The residue contained glutamic acid and aspartic acid and also traces of other amino acids. After cooling of the filtrate a small amount of a mixture of amino acids precipitated containing a high proportion of glutamic acid. The filtrate contained little (if any) glutamic acid or aspartic acid.

EXAMPLE III

A slurry of 10% by weight of H.V.P. in a 50:50 mixture of isopropanol and methanol was prepared. This was treated by the addition of a small amount (approximately 0.2% by weight) of sodium bicarbonate. The slurry was heated to the boiling point and filtered while hot. The residue contained glutamic acid and aspartic acid and also traces of other amino acids. After cooling of the filtrate a small amount of a mixture of amino acids precipitated containing a high proportion of glutamic acid.

EXAMPLE IV 320 grams of H.V.P. was added to a 3200 ml. mixture of isopropanol and methanol (50:50 by volume) to which 6 grams of solid sodium hydroxide had been added. After standing, with occasional shaking, for three days, the slurry was heated to the boiling point and filtered while warm through a sintered glass filter. The resulting solid ffaction contained about 15.88 grams of monosodium glutamate along with monosodium aspartate and salt. Only traces of any of the monoaminomonocarboxylic acids were found in this solid fraction. The monosodium glutamate amounted to approximately 96.5% of the glutamic acid originally in the 320 grams of H.V.P.

The filtrate from which the monosodium glutamate has been separated was evaporated under reduced pressure to about 1.2 specific gravity and cooled. Any precipitate formed was separated by filtration and consisted mainly of leucine, isoleucine, valine, methionine, and threonine.

The remaining syrup contained most of the proline originally present in gluten (about 12%) which had been carried through the entire monosodium glutamate process to the end liquor and from there to the fraction free of glutamic acid, aspartic acid, salt, and most of other less soluble amino acids. This syrup still amounted to about 22% of the original H.V.P. Addition of a small amount of ether and dioxane (2–5% of each) resulted in separation of a supernatant clear liquid phase which was separated and evaporated to yield substantially pure proline. The other phase contained almost no proline and the rest of other amino acids.

EXAMPLE V

Methanol-isopropanol mixtures containing 0, 25, 50, 75 and 100% isopropanol were prepared, and three series of tests were carried out by addition of 20, 10 and 2.5% H.V.P. from wheat gluten. The resulting slurries were allowed to stand in closed bottles with occasional shaking for about two days. The slurries were then rapidly filtered and washed once with about one tenth of the alcohol used in the particular test. The filtrates were evaporated on a steam bath, weighed, and subjected to chromatographic analysis by methods known in the art. The residues were also dried, weighed, chromatographically analyzed, and the glutamic acid content determined by the well known Warburg method. The latter was calculated to percent monosodium glutamate originally present in our H.V.P. The results are shown on the table following:

Table 1
SOLUBILITY OF H.V.P. IN METHANOL-ISOPROPANOL MIXTURES

| Batch No. | Isopropanol in Alcohol Mix., Percent by volume | H.V.P. Added G. | H.V.P. Added Percent by weight | Soluble Fraction G. | Soluble Fraction Percent by weight | Insol. Fraction G. | Insol. Fraction Percent by weight | M.S.G. in Insolubles G. | M.S.G. in Insolubles Percent by weight | M.S.G. Yield in Insol., Percent by Weight |
|---|---|---|---|---|---|---|---|---|---|---|
| 1 | 100 | 20 | 20 | 0.1 | 0.5 | 19.9 | 99.5 | 1.039 | 5.22 | 100.4 |
| 2 | 75 | 20 | 20 | 1.9 | 9.5 | 18.1 | 98.1 | 0.980 | 5.41 | 94.7 |
| 3 | 50 | 20 | 20 | 5.1 | 20.5 | 14.9 | 79.5 | 0.381 | 2.56 | 36.9 |
| 4 | 25 | 20 | 20 | 8.6 | 43.0 | 11.4 | 57.0 | 0.306 | 2.68 | 29.6 |
| 5 | 0 | 20 | 20 | 9.5 | 47.5 | 10.5 | 52.5 | 0.189 | 1.80 | 18.3 |
| 6 | 100 | 10 | 10 | 0.2 | 2.0 | 9.8 | 98.0 | 0.325 | 3.32 | 62.9 |
| 7 | 75 | 10 | 10 | 1.3 | 13.0 | 8.7 | 87.0 | 0.500 | 5.74 | 96.6 |
| 8 | 50 | 10 | 10 | 2.2 | 22.0 | 7.8 | 78.0 | 0.512 | 6.57 | 99.2 |
| 9 | 25 | 10 | 10 | 3.3 | 33.0 | 6.7 | 67.0 | 0.417 | 6.22 | 80.6 |
| 10 | 0 | 10 | 10 | 5.5 | 55.0 | 4.5 | 45.0 | 0.170 | 3.70 | 32.2 |
| 11 | 100 | 2.5 | 2.5 | 0.1 | 4.0 | 2.4 | 96.0 | | | |
| 12 | 75 | 2.5 | 2.5 | 0.2 | 8.0 | 2.3 | 92.0 | | | |
| 13 | 50 | 2.5 | 2.5 | 0.8 | 32.0 | 1.7 | 68.0 | | | |
| 14 | 25 | 2.5 | 2.5 | 1.3 | 51.0 | 1.2 | 48.0 | | | |
| 15 | 0 | 2.5 | 2.5 | 2.2 | 88.0 | 0.3 | 12.0 | | | |

M.S.G. content: 5.17% by weight.
Salt content: 49.1% by weight.

FIG. 3 was drawn using data in Table 1 and shows the relationship between the amount of monosodium glutamate in the insoluble residue after extraction of H.V.P. with various solvent combinations at concentrations of 10% and 20% by weight of H.V.P. in the solvent. The 20% H.V.P. curve shows that the solubility of monosodium glutamate decreases as the isopropanol concentration of the alcohol mixture increases. However, when 10% H.V.P. by weight is dispersed in methanol-isopropanol, monosodium glutamate is substantially completely insoluble at an isopropanol concentration between about 55% and about 60%. On the other hand, the monoaminomonocarboxylic acids are preferentially dissolved under these conditions. This discovery is of great importance; since under these conditions glutamic acid and aspartic acid, together with salt, can be substantially completely recovered from dried end liquors containing amino acids by mere filtration of a 10% by weight H.V.P. slurry in anhydrous solvent consisting of between about 50% and about 60% isopropanol and methanol. Glutamic acid can then be separated from the salt and aspartic acid by well known methods. Proline can be separated from the alcohol extract as described herein.

Having thus fully described and illustrated the instant invention, what is desired protected by Letters Patent is:

1. A method for separating the monoaminomonocarboxylic acids from the dicarboxylic amino acids present in glutamic acid end liquors derived from wheat gluten hydrolysates which comprises spray drying glutamic acid end liquor, mixing each part by weight of the resulting dry hydrolyzed vegetable protein with about 9 parts by weight of substantially anhydrous solvent consisting essentially of isopropanol and methanol in a ratio between about 1:1 and about 3:2, adding sufficient sodium hydroxide to the resulting mixture to convert the dicarboxylic amino acids to their monosodium salts, heating the resulting slurry to boiling, and separating the hot solution containing the monoaminomonocarboxylic acids from the solid fraction consisting essentially of monosodium glutamate, monosodium aspartate, and sodium chloride.

2. The method of claim 1 wherein the solution containing the monoaminomonocarboxylic acids is evaporated to about 1.2 specific gravity, between about 2% and about 5% by weight of ether and of dioxane are added to the concentrated solution, and the supernatant clear liquid containing proline separated therefrom.

3. A process for separating monosodium glutamate from dried hydrolyzed vegetable protein derived from glutamic acid end liquors of protein hydrolysates from the group consisting of Steffen's filtrate hydrolysates and wheat gluten hydrolysates which comprises: dispersing about one part by weight of the hydrolyzed protein in about nine parts by weight of alcohol mixture consisting essentially of methanol and between about 50% and about 60% by volume of a higher alcohol from the group consisting of ethanol, propanol, and isopropanol; adding sufficient sodium hydroxide to the resulting dispersion to convert the glutamic acid therein to monosodium glutamate; heating the dispersion; and separating the solution containing monoaminomonocarboxylic acid from the residue containing monosodium glutamate.

4. A method for separating monosodium glutamate from glutamic acid end liquor obtained from protein hydrolysates from the group consisting of Steffen's filtrate hydrolysates and wheat gluten hydrolysates, which comprises drying said glutamic acid end liquor, collecting the resulting dried hydrolyzed vegetable protein, preparing a dispersion containing between about 8% and about 12% by weight of said dried hydrolyzed vegetable protein in a substantially anhydrous solvent consisting essentially of methanol and between about 50% and about 60% by volume of isopropanol, adding sufficient sodium hydroxide to the resulting slurry to convert the glutamic acid to its monosodium salt, heating the resulting mixture to boiling, and separating the hot solution from the residue which contains monosodium glutamate.

5. The method of claim 4 wherein the glutamic acid in the end liquor is converted to monosodium glutamate prior to the drying step.

References Cited in the file of this patent
UNITED STATES PATENTS
2,706,737   Cardinal _____ Apr. 19, 1955

OTHER REFERENCES

Greenberg: "Amino Acids and Proteins" (1951), pp. 238–239.